Dec. 20, 1938.   H. E. GRAY   2,140,579
AVERAGING DEVICE
Filed Aug. 20, 1937

INVENTOR
Harold E. Gray
BY
Alan N. Mann
ATTORNEY

Patented Dec. 20, 1938

2,140,579

UNITED STATES PATENT OFFICE 2,140,579

AVERAGING DEVICE

Harold E. Gray, Brownsville, Tex.

Application August 20, 1937, Serial No. 160,147

13 Claims. (Cl. 33—70)

My invention relates to a method and apparatus for sighting celestial bodies and more particularly to an octant device and method for measuring the average altitude of a celestial body over a period of time whereby the accuracy of the measurement is markedly improved.

The present invention is adaptable for use in connection with an octant or sextant or any other suitable type of instrument designed to measure the altitude of a celestial body with respect to the horizontal as defined by gravity. It is to be understood therefore that the term, octant, as used in the specification and claims herein is used in a generic sense and includes the sextant and all other equivalent mechanisms.

An octant of the bubble type is commonly used on aircraft and sometimes on marine vessels to take sights on heavenly bodies, e. g. the moon, sun and certain stars, to determine the altitude of this body and thereby determine the location in degrees longitude and latitude of the ship at any given time. As is well known, this determination comprises measuring the angle between a horizontal plane tangent to the earth's surface at the point at which the sight is taken and a plane passing through the heavenly body and the said point on the earth. This measured angle, commonly referred to as the altitude of the heavenly body is equivalent to the co-angle of the zenith distance, that is, the distance between the point on the earth at which the measurement is made and a distant point on the earth, the location of which at a given time has been predetermined and is therefore known. Accordingly, a determination of the zenith distance in the manner indicated will inform the pilot of the airship or surface vessel of his line of position on the earth at the time the sight is taken.

In taking a sight with a bubble octant as explained above the conventional modus operandi is to bring the bubble and the celestial body into coincidence and then read the time and altitude as indicated by the octant. However, since the bubble is affected by an acceleration in the horizontal plane of the moving ship on which it is used, as well as by gravity, it does not indicate a true vertical but instead the resultant of both acceleration and gravity. Hence, any instantaneous sight is subject to an error that is proportional to the degree of acceleration present in the horizontal plane of the ship at the instant of taking the sight. This error may amount to a distance of one hundred miles or more. The consequences of this incorrect measurement are oftentimes serious.

In an attempt to compensate for this error it has heretofore been the practice to take a number of separate sights, recording each sight as taken, and finally arithmetically averaging all of the sights with the hope that the several errors would oppose each other and cancel out at least to some extent. However, there is no certainty that the errors will cancel out and it is quite possible to have the errors of the majority or all of the sights in the same direction. In practice, it has been found that these errors are not compensating and the resultant reading may be incorrect to the extent of five to twenty miles, which is oftentimes not a permissible error.

An object of my invention is to provide method and means for taking a continuous sight over a period of time and averaging the altitudes measured whereby the error in measuring the true altitude of the body sighted will be minimized and the location of the point from which the sight is taken more accurately determined.

The improved method and means of the present invention are based upon my conception of taking a continuous sight of a celestial body over a period of time with an octant which is provided with an averaging device that indicates at the end of the sight the true average reading for the entire interval during which the sight is taken. In applying this method to a bubble octant, the complete cycle of oscillation of the bubble is followed and the average reading obtained will represent a value considerably closer to the true value than that heretofore obtainable with the single or several separate sight methods. The feature of taking a continuous sight or measurement over an appreciable length of time and automatically averaging the measurements to obtain the true altitude of the body sighted is of the essence of my invention. When the sight is taken continuously for a period of say five minutes and the average obtained the error in measurement will be reduced from the usual error of 5 to 20 miles to about one mile or less. If the sight is taken continuously for a relatively long period of time such as 10 minutes the error in measurements will be reduced to a practically negligible factor.

The averaging device used in connection with my invention may assume many different mechanical forms some of the features of which have been used heretofore in other fields and for different purposes. I am aware of certain prior art devices employing integrating mechanisms for mechanically computing the range of moving bodies, such as aircraft, to facilitate firing of anti-aircraft guns. I am also aware of certain prior patents disclosing integrating devices applied to conduits for determining the amount of liquid flow therethrough over periods of time; and patents showing automatic planimeters for integrating the areas under curves previously plotted on paper. Some of these prior devices embody apparatus that may be modified and used in connection with my invention. However, none of these prior patents or devices, as far as I am aware, disclose the idea of a combination of an octant and averaging device for taking a continuous sight over a period of time and giving the true average for this period.

The method of operation of the invention will be easily understood from the following description taken in conjunction with the accompanying drawing which illustrates one suitable but non-limiting arrangement that may be used for carrying out the method of this invention.

Figure 1:
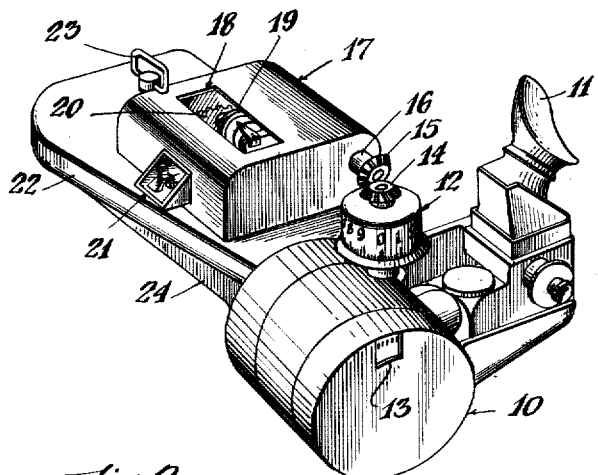
Figure 1 is a perspective view of a bubble octant with associated averaging mechanism.

The device generally illustrated in Fig. 1 comprises a bubble octant 10 having an eye-piece 11 for sighting the celestial body. The details of construction and arrangement of the parts enclosed in the octant 10 are not shown, since they may be of standard form.

The octant 10 is provided with a rotatable knob 12 which is rotated during the operation of the octant to effect coincidence of the bubble and the image of the sighted body as described above. This knob 12 is suitably graduated for example into ten major parts, each reading one degree and sub-divided into twelve parts, each reading five minutes of arc. The octant is also provided with a window 13 through which the tens of degrees of the arc measured are read while the units of degrees in minutes are read directly from the octant knob 12.

Figure 2:
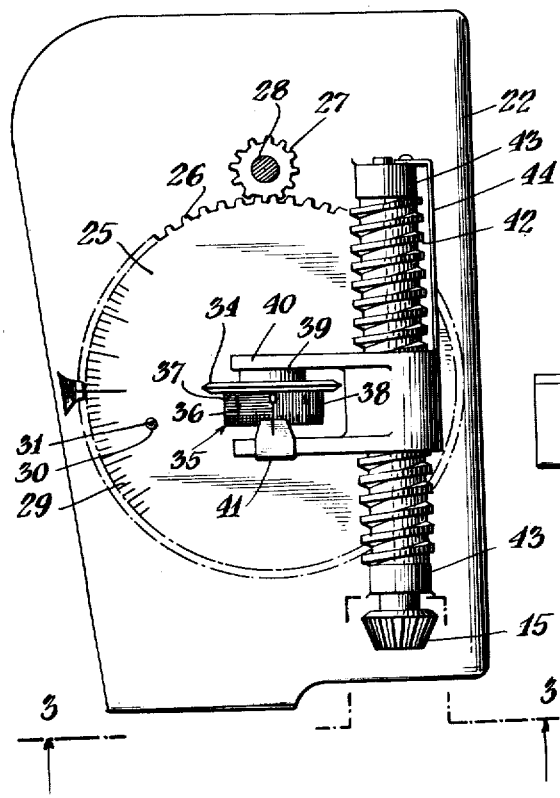
Figure 2 is a plan view of the averaging mechanism with housing removed.
Figure 3:
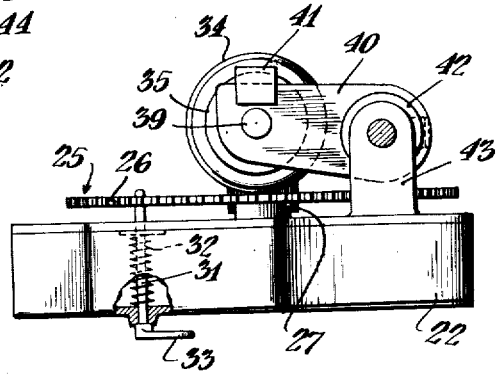
Figure 3 is an end view of the averaging mechanism taken along line 3—3 of Figure 2.

The knob 12 is provided, in accordance with this invention, with a bevel gear 14. This gear meshes with another gear 15 connected to a rotatable shaft 16, the extension of which is enclosed by a housing shown generally at 17. Located within this housing and visible through an elongated slot or window 18 is a vertical index wheel 19 and a horizontal gear or turn-table 20 which is also visible through a window shown at 21. The details of the index wheel and turn-table are illustrated in Figs. 2 and 3 and are described below. Located in any suitable manner beneath the turn-table 20 and connected thereto is a clock-work, not shown, which may be covered by a housing 22. The clock-work may be operated by the conventional type of clock-spring which is wound by the key shown at 23. The averaging device, including the clock-work and superstructure, may be made integral with the octant 10 by having a common molded or cast frame as indicated at 24, although it is to be understood that the averaging device may be attached or otherwise associated with the octant in any suitable manner so long as the cooperative relationship between the two devices as described herein is maintained.

Referring now more specifically to Figs. 2 and 3, the averaging device as shown therein comprises a turn-table 25 which has its periphery formed into teeth shown at 26. The teeth 26 mesh with the teeth on a gear 27 rotated by shaft 28. The shaft 28 is connected to the above mentioned clock mechanism, which for the sake of simplicity is not shown. It is to be understood that any suitable form of spring motor or other source of power for rotating the turn-table 25 may be used in place of the clock mechanism. The turn table 25 is graduated around its circumference with a scale 29 running from 0 to 1 and divided into hundredths. Some suitable means for starting and stopping the turn-table 25, which is rotated by the clock-work connected thereto through the gear 27, should be provided. One convenient form may consist of an opening 30 in the turn table with which a stub-shaft 31, is caused to engage or disengage. The shaft 31 is provided with a coiled spring 32 and movable handle 33.

A wheel 34 having a relatively small diameter as compared with the turn-table 25 is mounted at substantially right angles to the turn table 25 and is free to rotate in contact with the upper surface of the turn-table. This wheel, which may be called the index wheel, is provided with a drum 35 the periphery of which is graduated as indicated at 36. The drum 35 may also be divided into two halves, which are separately identifiable in some manner. For example, one half of the drum may be colored blue as indicated by the horizontal lines 37 and the other half colored red as indicated by the vertical lines 38.

The index wheel 34 is rotatable on an axis 39 which is supported by a frame 40. An index pointer 41 is also provided on the frame 40 adjacent the scale on the drum 35. If the axis of the wheel 34, projected, passes through the axis of the turn-table 25, projected, then the wheel 34 will rotate upon rotation of the turn-table 25 at a rate proportional to the distance of its point of contact on the turn-table from the center of the turn-table. The frame 40 carrying the index wheel 34 is mounted on a spiral shaft 42. Upon rotation of the spiral shaft 42 the frame 40 is caused to move transversely and thereby moves the index wheel 34 across the face of the turn-table 25. Hence the distance of the point of contact of the index wheel 34 with the turn-table 25 from the center thereof may be regulated by rotation of the spiral shaft 42. This shaft 42 is supported by standards 43 mounted upon the housing 22. Connected to one of the standards 43 is a flexible finger 44 which is of such length that it will serve as a stop for the index wheel frame 40 when the wheel is over the exact center line of the turn-table 25. This finger 44 may therefore be used for setting the index wheel 34 at the exact zero or center point of the turn-table 25. During operation of the device however, the finger is flexed outward sufficiently to prevent interference with transverse movement in either direction of the frame 40.

The spiral shaft 42 is geared to the octant knob 12, as shown in Figure 1, so that as the knob is rotated to keep the image of the celestial body and the bubble together as explained hereinabove, the spiral shaft is rotated and the index wheel 34 is moved back and forth across the face of the turn-table 25. The rate of rotation of the index wheel 34 during this transverse movement is proportional to the amount of rotation of the octant knob 12.

As a practical matter, it has been found desirable to have the drum 35 graduated to cover about 10° of altitude measurement, and under this condition it is desirable to engage the averaging device with an altitude set upon the octant approximately equal to the altitude of the celestial body to be sighted. Hence, it is desirable to have the bevel gears 14 and 15 shown in Figure 1 so arranged that they may be engaged or disengaged.

According to one illustrative but non-limiting example which may serve to describe more clearly the details and arrangement of parts in the averaging device, the drum 35 on the index wheel 34 may be graduated from plus five degrees to minus five degrees so that one complete rotation of the wheel 34 will be equal to ten degrees. If it is desired to have the period of time of sight equal two minutes, then it is preferable to have the turn-table 25 graduated in hundredths from 0 to 1. Now, if the knob 12 of the octant 10 is so graduated that one complete revolution of the knob is equal to 10°, and the knob is rotated one complete revolution, the index wheel 34 will be caused to move off the center of the turn-table 25 a distance equal to the radius of the wheel 34. With this arrangement the ratios for the gears used may be determined as follows:

Let G. R.=the gear ratio between the octant knob 12 and the spiral shaft 42.
P=pitch of the spiral shaft 42.
R=radius of the index wheel 34.

Then with the index wheel graduated into 10°—

$$R = P \times G. R.$$

Thus, if the gear ratio is 3 to 1 and the pitch of the spiral shaft 42 is three threads per inch, the radius of the index wheel 34 will be:

$$R = P \times G. R. = \tfrac{1}{3} \times 3 = 1''$$

If a different number of graduations is desired on the index wheel 34 let the number of degrees equal N
Then $$R = P \times G.R. \times \frac{N}{10}$$

With the foregoing description of the apparatus in mind, the operation of the octant with associated averaging device may be carried out as follows:

The index wheel 34 is set at the center of the turn-table 25. The bevel gears 14 and 15 are disengaged. The octant knob 12 is then adjusted to the approximate altitude of the celestial body to be sighted. Bevel gears 14 and 15 are then re-engaged. The octant is then read in the usual manner and the altitude recorded. The index wheel 34 is then set at 0, the image of the celestial body and the bubble in the octant are brought into coincidence, and the turn-table 25 driven by the clock-work connected thereto, is started to rotate by withdrawing the stub shaft 31. The sight is taken continuously keeping the bubble and the celestial body in coincidence, for the desired length of time, or until clouds obscure the celestial body. Immediately upon termination of the sight, the time is read. Then the reading on the drum 35 of the index wheel 34 is divided by the reading on the scale of the turn-table 25 and the quotient is either added to or subtracted from the initial octant reading to obtain the true average reading.

If the period of sight for which the device has been designed, for example two minutes has been used as the sight-taking period, then the reading on the turn-table 25 will be 1, and as a result the reading indicated by the drum 35 on the index wheel 34 will need no correction, that is, it will not be necessary to divide it by the reading shown on the turn-table 25. In this instance the turn-table 25 is graduated into hundredths, and is regulated to make one revolution in exactly two minutes. At the end of the measurement the hundredths of minutes shown on the turn-table are subtracted from the recorded time of sight to obtain the average time.

In order to obtain the best results from the above described operation of my invention, the variations in the rate of turn of the turn-table 25 should not be greater than plus or minus two seconds per revolution for two or three consecutive revolutions; the diameter of the index wheel should be accurate within approximately plus or minus 0.001 inch. The index wheel should preferably be graduated into five minute intervals so as to be able to estimate the reading to the nearest minute.

It is to be understood that my invention is not limited to the foregoing specific description or to the type of devices illustrated in the accompanying drawing. Various modifications may be made in the size and form of the several mechanisms employed, and the duration of operation of the device may be regulated to suit conditions at the time the sight is taken. To obtain optimum results the sighting operation may be extended continuously over a relatively long period of time. Any suitable form of octant or sextant or equivalent device as defined hereinabove may be used in association with the averaging device to obtain the desired correct altitude of the celestial body sighted.

Some of the novel features of my invention are defined in the appended claims:

I claim:

1. A device for obtaining the altitude of a celestial body comprising a bubble octant and an averaging mechanism connected to said octant for averaging the altitude measurements taken by said octant, said averaging mechanism comprising a power driven turn-table and a rotatable index wheel in frictional contact with said turn-table.

2. A device for obtaining the altitude of a celestial body comprising a bubble octant and an altitude averaging mechanism connected to said octant for averaging the altitudes measured by said octant, said averaging mechanism comprising a power driven turn-table, a rotatable index wheel in frictional contact with said turn-table, a carriage for said index wheel, a rotatable screw shaft supporting said carriage, and means for connecting said screw shaft in cooperative relationship with said octant whereby movement of the sighting means on said octant will be transmitted to said index wheel and measurement of the average altitude indicated thereon.

3. A device for measuring the average altitude of a celestial body comprising an octant having a rotatable sight measuring knob, a gear mounted on said knob, and a mechanical averaging mechanism having a gear that meshes with said octant knob gear, whereby the rotary movement of said knob effected during measurement of said altitude is transmitted to said averaging mechanism which utilizes this movement to give a numerical average of the measurements taken by said octant.

4. A device for obtaining the mean altitude of a celestial body over a period of time comprising means for continuously sighting the angular distance of a celestial body with respect to an artificial horizon and means operatively connected to said first means and controlled thereby for continuously integrating said angular distance with respect to time.

5. A device for obtaining the mean altitude of a celestial body over a period of time comprising means for continuously sighting the angular distance of a celestial body with respect to an artificial horizon, means operatively connected to said first means and controlled thereby for continuously integrating said angular distance with respect to time and means for operating said second means and for measuring the interval of time during which said integration was made.

6. A device for obtaining the mean altitude of a celestial body over a period of time comprising means for continuously sighting the angular distance of a celestial body said means including an artificial horizon maintained in continual coincidence with an image of said celestial body, and a mechanism operatively connected to said means and controlled thereby so that it continually integrates with respect to time said angular distance as determined by said continual coincidence between the celestial body and artificial horizon.

7. A device for obtaining the mean altitude of a celestial body over a period of time comprising means for continuously sighting the angular distance of a celestial body with respect to an artificial horizon and an integrating mechanism mechanically and cooperatively connected to said sighting means for integrating said angular distance with respect to time, said mechanism comprising a rotatable member moved in correspondence with the varying movements of said angular distance measuring means, and a second rotatable member located in cooperative relationship with said first member such that rotation of said second member causes rotation of said first member and means on said second member for measuring the interval of time during which said integration is made.

8. A device for obtaining the mean altitude of a celestial body over a period of time comprising means for taking an uninterrupted prolonged sight of a celestial body and measuring the altitude of said body and means operatively connected with said first means and controlled thereby for automatically integrating the altitudes measured during taking of said prolonged sight.

9. A device for obtaining the mean altitude of a celestial body over a period of time comprising an octant for taking an uninterrupted prolonged sight of a celestial body and measuring the altitude of said body and means operatively connected with said octant and controlled thereby for automatically integrating the altitudes measured during taking of said prolonged sight.

10. A device for obtaining the mean altitude of a celestial body over a period of time comprising means for taking an uninterrupted continuous sight and integrating means mechanically connected to said sight taking means and jointly operatable therewith that continuously and automatically integrates the angular distances sighted during said continuous sight and at the end of said period of time indicates the mean value of said continuous sight.

11. A device for obtaining the mean altitude of a celestial body over a period of time comprising means for taking an uninterrupted prolonged sight of a celestial body and measuring the altitude of said body and means operatively connected with said first means and controlled thereby for automatically integrating the altitudes measured during taking of said prolonged sight, said second means comprising a rotatable disc and a rotatable index wheel in frictional contact with said disc.

12. A device for obtaining the mean altitude of a celestial body over a period of time comprising means for taking an uninterrupted prolonged sight of a celestial body and measuring the altitude of said body and means geared to said first means and controlled thereby for automatically integrating the altitudes measured during taking of said prolonged sight.

13. A device for obtaining the mean altitude of a celestial body over a period of time comprising means for taking an uninterrupted prolonged sight of a celestial body and measuring the altitude of said body, means for continuously integrating the altitudes measured and means for cooperatively connecting said first and second means.

HAROLD E. GRAY.

DISCLAIMER 2,140,579.—*Harold E. Gray*, Brownsville, Tex. AVERAGING DEVICE. Patent dated December 20, 1938. Disclaimer filed October 8, 1941, by the assignee, *Henry Hughes & Son Limited*.

Hereby enters this disclaimer to claim 3 of said patent.

[*Official Gazette November 4, 1941.*]

nected to said first means and controlled thereby for continuously integrating said angular distance with respect to time.

5. A device for obtaining the mean altitude of a celestial body over a period of time comprising means for continuously sighting the angular distance of a celestial body with respect to an artificial horizon, means operatively connected to said first means and controlled thereby for continuously integrating said angular distance with respect to time and means for operating said second means and for measuring the interval of time during which said integration was made.

6. A device for obtaining the mean altitude of a celestial body over a period of time comprising means for continuously sighting the angular distance of a celestial body said means including an artificial horizon maintained in continual coincidence with an image of said celestial body, and a mechanism operatively connected to said means and controlled thereby so that it continually integrates with respect to time said angular distance as determined by said continual coincidence between the celestial body and artificial horizon.

7. A device for obtaining the mean altitude of a celestial body over a period of time comprising means for continuously sighting the angular distance of a celestial body with respect to an artificial horizon and an integrating mechanism mechanically and cooperatively connected to said sighting means for integrating said angular distance with respect to time, said mechanism comprising a rotatable member moved in correspondence with the varying movements of said angular distance measuring means, and a second rotatable member located in cooperative relationship with said first member such that rotation of said second member causes rotation of said first member and means on said second member for measuring the interval of time during which said integration is made.

8. A device for obtaining the mean altitude of a celestial body over a period of time comprising means for taking an uninterrupted prolonged sight of a celestial body and measuring the altitude of said body and means operatively connected with said first means and controlled thereby for automatically integrating the altitudes measured during taking of said prolonged sight.

9. A device for obtaining the mean altitude of a celestial body over a period of time comprising an octant for taking an uninterrupted prolonged sight of a celestial body and measuring the altitude of said body and means operatively connected with said octant and controlled thereby for automatically integrating the altitudes measured during taking of said prolonged sight.

10. A device for obtaining the mean altitude of a celestial body over a period of time comprising means for taking an uninterrupted continuous sight and integrating means mechanically connected to said sight taking means and jointly operatable therewith that continuously and automatically integrates the angular distances sighted during said continuous sight and at the end of said period of time indicates the mean value of said continuous sight.

11. A device for obtaining the mean altitude of a celestial body over a period of time comprising means for taking an uninterrupted prolonged sight of a celestial body and measuring the altitude of said body and means operatively connected with said first means and controlled thereby for automatically integrating the altitudes measured during taking of said prolonged sight, said second means comprising a rotatable disc and a rotatable index wheel in frictional contact with said disc.

12. A device for obtaining the mean altitude of a celestial body over a period of time comprising means for taking an uninterrupted prolonged sight of a celestial body and measuring the altitude of said body and means geared to said first means and controlled thereby for automatically integrating the altitudes measured during taking of said prolonged sight.

13. A device for obtaining the mean altitude of a celestial body over a period of time comprising means for taking an uninterrupted prolonged sight of a celestial body and measuring the altitude of said body, means for continuously integrating the altitudes measured and means for cooperatively connecting said first and second means.

HAROLD E. GRAY.

DISCLAIMER 2,140,579.—*Harold E. Gray*, Brownsville, Tex. AVERAGING DEVICE. Patent dated December 20, 1938. Disclaimer filed October 8, 1941, by the assignee, *Henry Hughes & Son Limited*.

Hereby enters this disclaimer to claim 3 of said patent.

[*Official Gazette November 4, 1941.*]